US007142096B2

(12) United States Patent
Eisenman

(10) Patent No.: US 7,142,096 B2
(45) Date of Patent: Nov. 28, 2006

(54) COMBINATION CAR ALARM AND PERSONAL LOCATOR SYSTEM

(76) Inventor: Robert C Eisenman, 2690 Pala Mesa Ct., Costa Mesa, CA (US) 92677

( * ) Notice: Subject to any disclaimer, the term of this patent is extended or adjusted under 35 U.S.C. 154(b) by 0 days.

(21) Appl. No.: 09/753,163

(22) Filed: Jan. 2, 2001

(65) Prior Publication Data
US 2002/0084893 A1 Jul. 4, 2002

(51) Int. Cl.
B60R 25/10 (2006.01)
(52) U.S. Cl. .............. 340/426.1; 340/426.13; 340/426.17; 340/426.19; 340/426.2; 340/10.1; 340/10.3; 340/539.11; 340/539.13
(58) Field of Classification Search .............. 340/540, 340/573.1, 426, 10.1, 10.3, 539, 426.1, 426.13, 340/426.17, 426.19, 426.2, 539.11, 539.13
See application file for complete search history.

(56) References Cited

U.S. PATENT DOCUMENTS

| 5,630,206 | A | * | 5/1997 | Urban et al. ............. 455/456.1 |
| 5,742,233 | A | * | 4/1998 | Hoffman et al. ............ 340/573 |
| 5,838,237 | A | | 11/1998 | Revell et al. |
| 5,884,199 | A | | 3/1999 | Maki |
| 5,899,855 | A | | 5/1999 | Brown |
| 5,913,827 | A | | 6/1999 | Gorman |
| 5,929,761 | A | * | 7/1999 | Van der Laan et al. ... 230/573.1 |
| 5,959,529 | A | | 9/1999 | Kail, IV |
| 5,963,130 | A | | 10/1999 | Schlager et al. |
| 5,973,412 | A | * | 10/1999 | Nantz et al. ................ 307/10.5 |
| 6,028,514 | A | | 2/2000 | Lemelson et al. |
| 6,084,517 | A | * | 7/2000 | Rabanne et al. ......... 340/573.4 |
| 6,292,110 | B1 | * | 9/2001 | Budnovitch .............. 340/932.2 |
| 6,392,592 | B1 | * | 5/2002 | Johnson et al. ......... 342/357.07 |
| 6,437,692 | B1 | * | 8/2002 | Petite et al. ................ 340/540 |
| 2001/0028196 | A1 | * | 10/2001 | Burr et al. ................. 307/10.1 |

OTHER PUBLICATIONS

Global Positioning System Overview, Peter H. Dana, Department of Geography, University of Texas at Austin.*

* cited by examiner

Primary Examiner—Julie Bichngoc Lieu
(74) Attorney, Agent, or Firm—Rutan & Tucker, LLP

(57) ABSTRACT

A combination vehicle alarm and locator device. The device includes a housing, a vehicle alarm activator positioned within the housing including a transmitter for activating an alarm system on a vehicle and an infrared transmitting device located in the housing for communicating with a Global Positioning Satellite system for determining a location of the device. A key ring selectively extends from a side of the housing. The vehicle alarm activator includes an alarm activation button extending from the housing for activating the vehicle alarm activator to transmit the infrared signal. The transmitter device includes a processor, a memory device for storing identification information concerning the device and an activation button for activating the processor to retrieve the identification information from the memory for transmission to the Global Positioning Satellite system. The device also includes a speaker connected to the processor for optionally generating an audible signal when the activation button is activated. A clip is releasably connected to the housing for releasably securing the device to an article of clothing of the user. First, second and third visual indicators are provided on the housing for indicating when the activation button is activated, when the device is in an on mode and when the level of the power source is below a threshold value.

7 Claims, 11 Drawing Sheets

COMBINATION CAR ALARM AND PERSONAL LOCATOR SYSTEM

BACKGROUND OF THE INVENTION

1. Field of the Invention

The present invention relates generally to locator systems and, more specifically, to a car alarm and locking system including a personal locator device able to be readily carried by an individual, wherein the personal locator device utilizes the Global Positioning Satellite System for locating the position of an individual upon activation.

2. Description of the Prior Art

Numerous types of combination vehicle alarm and locator systems have been provided in the prior art. For example, U.S. Pat. Nos. 5,742,233; 5,838,237; 5,884,199; 5,889,855; 5,913,827; 5,929,761; 5,959,529; 5,963,130; 6,028,514 and 6,094,140, While these combination vehicle alarm and locator system may be suitable for the purposes for which they were designed, they would not be as suitable for the purposes of the present invention, as hereinafter described.

U.S. Pat. No. 5,742,233

Inventor: Mark S. Hoffman et al.

Issued: Apr. 21, 1998

A signaling system comprises a portable signaling unit, a remote alarm switch device, a central dispatch station, and a wireless communication system such as a cellular or telephone system, etc., and a GPS or like system. The portable signaling unit and the remote alarm switch may be adapted to be worn at different locations on the person's body. The remote alarm switch may be concealed in the form of a wristband or in the form of any other object such as a broach, pendant, or key chain. When the person in distress activates the remote alarm switch or when the remote alarm switch is removed from the individual by a forceful or unauthorized action or when the signaling unit is removed from the proximity of the remote alarm switch, the portable signaling unit sends a data transmission which includes its location to the central dispatch station. The portable signaling unit also has manual alarm trigger capabilities so it can be used without the remote alarm switch unit. The central dispatch station receives the data transmission and accurately displays the user identification, stored personal information, nature of the alarm; in addition the location of the portable signaling unit is superimposed on a digitized map at a position corresponding to the location of the person wearing the portable signaling unit. The portable signaling unit can be remotely activated from a central dispatch station to determine and monitor the location of the portable signaling unit.

U.S. Pat. No. 5,838,237

Inventor: Graeme Charles Revell et al.

Issued: Nov. 17, 1998

A self-contained personal alarm device capable of signaling its location to a remote site such as a security station. The personal alarm device includes a housing enclosing a controller, an antenna, a cellular transmitter and a cellular receiver. The controller is coupled to the transmitter and receiver, which are in turn coupled to the antenna. The controller controls the transmitter and the receiver to receive position location signals such as Global Positioning System signals (GPS), establish a cellular connection with a remote site, and transmit device location data to the remote site on the cellular connection, wherein the device location data indicates the location of the device. The cellular connection is established via a cellular telecommunication network that includes an array of cell base stations. The GPS signals are transmitted to the device over the cellular network by providing each cell base station with a Differential Global Positioning System (DGPS) receiver. Using the DGPS receivers, GPS signals are repeated over the cellular network.

U.S. Pat. No. 5,884,199

Inventor: Hiroshi Maki

Issued: Mar. 16, 1999

A portable wireless receiver is provided which has a position locating function through reception of GPS satellite radio waves. The portable wireless receiver has a speaker/microphone unit including a GPS antenna, a speaker, and a microphone built in the unit.

U.S. Pat. No. 5,899,855

Inventor: Stephen James Brown

Issued: May 4, 1999

The device provides a protective enclosure or barrier by inserting an internal housing frame into the already existing housing box provided for telephone line access. This frame accommodates a removable cover plate with custom cut holes designed for both lock (cam lock) and plunger switch (i.e. tamper switch). The original exterior cover plate is placed over the front of the inserted invention so as to hold the plunger switch down in position, ready for alarm activation. The installation of the above device prevents or deters a would-be burglar from cutting or damaging telephone lines after removal of the exterior cover plate.

U.S. Pat. No. 5,913,827

Inventor: Peter Gregory Gorman

Issued: Jun. 22, 1999

A personal monitor for monitoring a biomedical condition, such as a heart rate. A sensor provides a signal related to the biomedical condition and the signal is encoded for repeated wireless transmission to a receiver. An encoded identification signal is also repeatedly sent to the receiver to identify the transmitter to the receiver in order to prevent the adverse effects of Interference which occurs if signals other than those from the transmitter are received. The monitor detects deviations (errors) from an expected pattern and recovers from these deviations (error correction) to display an accurate value of the biomedical condition. If too many errors are present due to interference, faulty transmission and/or reception, etc., the frequency over which wireless transmission occurs can be changed. In one embodiment, the value of the biomedical condition is wirelessly sent to the receiver. In another embodiment, the value of the biomedical condition is determined in the receiver based on the encoded signal that is received. The receiver rejects all signals that are not from the transmitter.

U.S. Pat. No. 5,929,761

Inventor: Rober Lambertus Van der Laan et al.

Issued: Jul. 27, 1999

There is described an alarm system (1) comprising: a carrier unit (10); a base unit (30) having an in-output (31) for coupling to a communication network (P); an alarm monitoring station (100) coupled to that communication network (P); wherein the carrier unit (10) comprises a transmitter (20) and an alarm switch (13) coupled to an alarm input (23) of the transmitter (20). By operating the alarm switch (13), the base unit (30) is wirelessly activated by the carrier unit (10). Accordingly, the base unit (30) makes connection with the communication network (P) and selects the access number of the alarm monitoring station (100). In accordance with the invention, the transmitter (20) comprises a microphone input (24) coupled to a microphone (14). Speech signals from the user are wirelessly transmitted by the transmitter (20) to the base unit (30), which transmits these speech signals via the communication network (P) to the alarm monitoring station (100).

U.S. Pat. No. 5,959,529

Inventor: Karl A. Kail, IV

Issued: Sep. 28, 1999

An automated, real-time, reprogrammable monitoring and control system for portable, remote sensors and subjects includes one or more portable monitoring units, each of the portable monitoring units having a sensor, a location-determining device, and a sensor interface unit. Each sensor interface unit is separately configured to monitor its sensor and to transmit that sensor's data, via a digital wireless communications network, to a central monitoring device. The portable unit is carried or worn by a person or animal, or affixed to an inanimate subject.

U.S. Pat. No. 5,963,130

Inventor: Dan Schlager et al.

Issued: Oct. 5, 1999

A self-locating remote monitoring system (750) includes a supervising base station (754) and one or more remote monitoring units (752). A remote unit (752) includes a navigational receiver (756) operating with an existing navigational system for providing a remote unit location (759) and includes a transmitter (758) for communicating the location (759) to the base station (754) for display (772). The remote unit (752) includes one or more physiological/environmental sensors (760) for monitoring at the remote location. In a specific embodiment a change in sensor status (761) results in the status and the location being transmitted to the base station (754). The base station (754) includes alarms (776) and displays (772) responsive to the change in status. One embodiment defines a man-over-board system (300) which combines water immersion (308) and distance (334) from the base station (318) to trigger an alarm (332) and begin location tracking (324). Another embodiment defines an invisible fence system (1020) which uses location (1035) and time (1039) to define boundaries for containment and exclusion. Another embodiment includes a weather surveillance radar receiver (1188) providing weather parameters (1189) within a weather region (1193) and defines a remote weather alarm system (1180). The weather alarm system (1180) uses the weather receiver (1188) to monitor weather within a defined region (1193) and to provide the base station (1184) with location (1187) and weather parameters (1199) if the parameters fall outside defined limits (1195).

U.S. Pat. No. 6,028,514

Inventor: Jerome H. Lemelson et al.

Issued: Feb. 22, 2000

A comprehensive system and method for monitoring a geographic person location, periodically warning a person of emergency situations in the geographic location, and transmitting requests for assistance in emergency situations. The system comprises a warning unit 12 that is carried by the person or that is located in mobile units 20 or in buildings or houses 19. The warning unit 12 includes a geographic satellite receiver 38, a receiver circuit that receives broadcast warning signals defining dangerous situations and geographic locations of the situations, a computer controller including a processor 42 and a memory 44, an alarm indicator 64 or 66 that indicates when the person is in danger, and a transmission circuit that generates and transmits signals requesting assistance and signals warning of the dangerous situations in a vicinity of the person carrying the portable warning unit 12 along with the current geographic location of the person. The system further comprises a command center 10. The command center 10 includes a database computer 102 having a database storage unit 104, a transmitter for broadcasting signals to the unit(s) 12, a receiver for receiving signals, a transmitter for transmitting signals to emergency response units and centers, and other such communication devices. The system uses the unit(s) 12 to monitor and communicate with the person using it. The unit(s) 12 interfacingly communicate with the command center 10. Signals indicative of a dangerous situation and a geographic situation location are transmitted from the command center 10 to the unit(s) 12. The geographic person location is compared with the geographic situation location indicated in the received signal from the command center 10. Expert system rules are used to determine the dangerous situation and a degree(s) of danger index for the person(s) near or at the geographic situation location.

U.S. Pat. No. 6,094,140

Inventor: Thomas G. Parente

Issued: Jul. 25, 2000

A portable locator system for alerting a central station of an emergency. The portable alarm system includes a central unit for monitoring a desired area and a remote control unit for activating and signaling the central unit. The central unit includes a detector for detecting an emergency situation and generating a signal in response thereto, a processor for receiving the detection signal and generating an alarm signal in response thereto, a receiver for receiving an emergency signal and providing the emergency signal to the processor and an alarm for alerting the central station upon receipt of one of the alarm signal and emergency signal. The remote control unit includes a device for generating the emergency signal upon receipt of a user generated command and a transmitter for transmitting the emergency signal to the receiver of the central unit. The detection device is a motion detector for detecting motion in an area surrounding the central unit and the remote control unit includes an activation button for generating a signal for activating the motion detector. The remote control unit further includes a button for generating a medical emergency signal and a panic signal for transmission to the central unit. The transmitter includes at least one of a modem for connecting to and transmitting the alarm signal to the central station via telephone lines and a wireless transmitter for wirelessly transmitting the alarm signal to the central station.

SUMMARY OF THE PRESENT INVENTION

The present invention relates generally to locator systems and, more specifically, to a car alarm and locking system including a personal locator device able to be readily carried by an individual, wherein the personal locator device utilizes the Global Positioning Satellite System for locating the position of an individual upon activation.

A primary object of the present invention is to provide a combination vehicle alarm and locator system that will overcome the shortcomings of prior art devices.

Another object of the present invention is to provide a combination vehicle alarm and locator system able to utilize the Global Positioning Satellite (G.P.S.) system to determine the position of a control unit.

A further object of the present invention is to provide a combination vehicle alarm and locator system including a selectively actuated vehicle security function.

A yet further object of the present invention is to provide a combination vehicle alarm and locator system able to generate an audible tone.

A still further object of the present invention is to provide a combination vehicle alarm and locator system which is small, light weight and includes a key ring selectively attached thereto.

A further object of the present invention is to provide a combination vehicle alarm and locator system able to provide an alternative to dialing 911 in the case of an emergency when a phone is not available.

Another object of the present invention is to provide a combination vehicle alarm and locator system that is simple and easy to use.

A still further object of the present invention is to provide a combination vehicle alarm and locator system that is economical in cost to manufacture.

Additional objects of the present invention will appear as the description proceeds.

A combination vehicle alarm and locator device is disclosed by the present invention. The device includes a housing, a vehicle alarm activator positioned within the housing including a transmitter for activating an alarm system on a vehicle and an infrared transmitting device located in the housing for communicating with a Global Positioning Satellite system for determining a location of the device. A key ring selectively extends from a side of the housing, The vehicle alarm activator includes an alarm activation button extending from the housing for activating the vehicle alarm activator to transmit the infrared signal. The transmitter device includes a processor, a memory device for storing identification information concerning the device and an activation button for activating the processor to retrieve the identification information from the memory for transmission to the Global Positioning Satellite system. The device may also includes a speaker connected to the processor for generating an audible signal when the activation button is activated. A clip is releasably connected to the housing for releasably securing (he device to an article of clothing of the user. First, second and third visual indicators are provided on the housing for indicating when the activation button is activated, when the device is in an on mode and when the level of the power source is below a threshold value.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

DESCRIPTION OF THE REFERENCED NUMERALS

Figure 1:
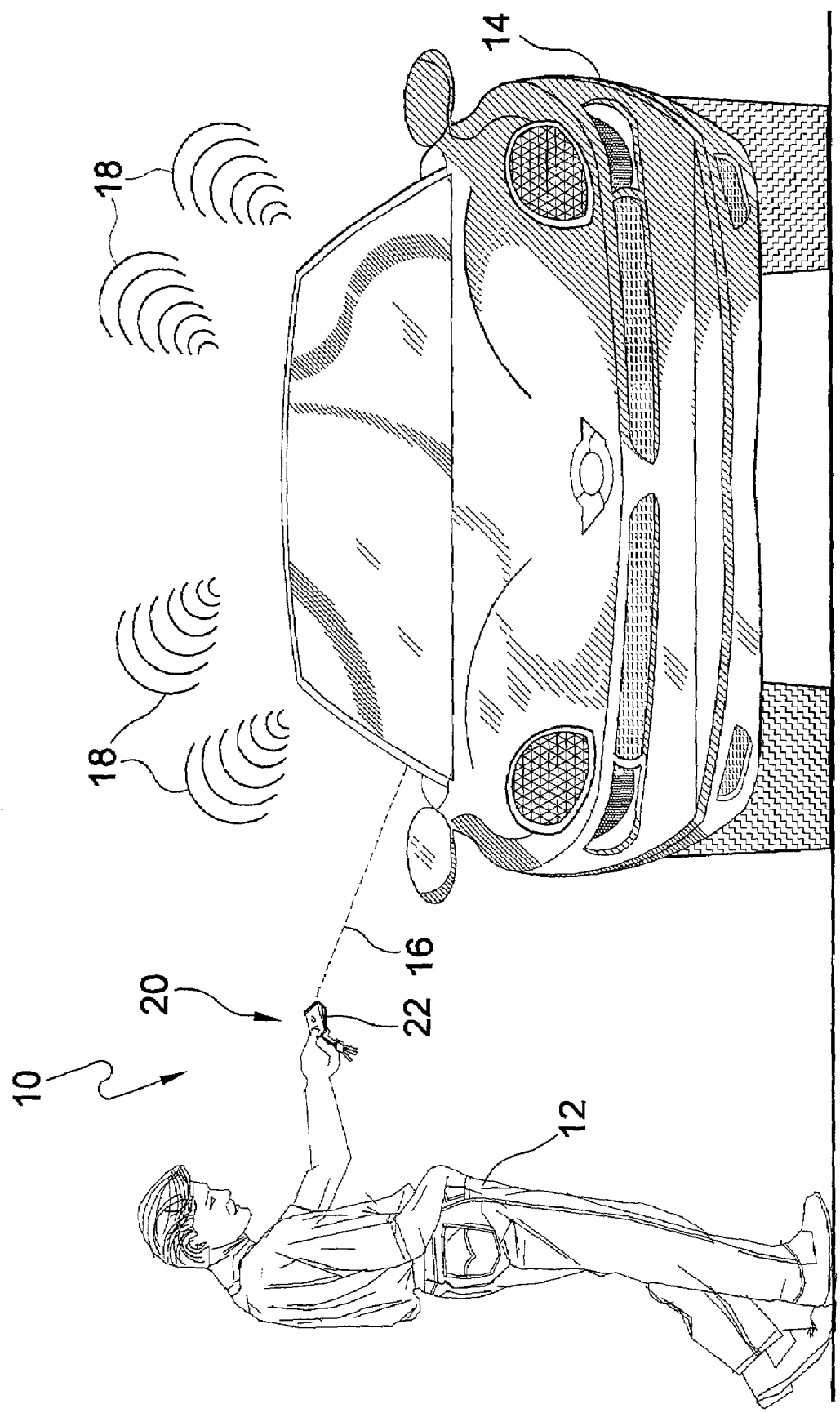
FIG. 1 is a perspective view of a person utilizing the vehicle security feature of the combination vehicle alarm and locator system of the present invention.

Turning now descriptively to the drawings, in which similar reference characters denote similar elements throughout the several views, the Figures illustrate the combination vehicle alarm and locator system of the present invention. With regard to the reference numerals used, the following numbering is used throughout the various drawing figures.

10 combination vehicle alarm and locator system of the present invention
12 person using alarm of combination vehicle alarm and locator system
14 vehicle
16 line indicating transmission of alarm signal
18 arced lines indicating sound generated by alarm system in vehicle
20 control unit of combination vehicle alarm and locator system
22 first key on control unit for activating vehicle alarm
24 wooded area
25 first button
26 person lost in wooded area
27 second button
28 map
29 operations station
30 arced lines indicating signal transmitted by control unit
31 satellite
32 second key for activation locator feature
33 child
34 arrow indicating transmission from the control unit to the satellite
35 pocket retaining control unit therein
36 arrow indicating transmission of location signal from satellite
37 clothing of child containing pocket
38 earth
39 worried parent
40 vehicle
41 receiving dish of central office
42 housing
43 operator at central office
44 face side of housing
45 computer at central office
48 visual indicator
50 cover
52 first LED
54 second LED
56 third LED
57 antenna
58 alarm LED
60 key ring
62 removable key ring retainer
64 battery
66 cover for infrared LED's
68 back side of housing
70 removable clip
72 speaker
73 arced lines indicating audible signals produced by speaker
74 top section
76 bottom section
78 internal circuitry
80 first recess for receiving emergency alert switch
82 second recesses for receiving visual indicator
84 third recess for receiving activation button for vehicle security system
86 infrared LED
88 clip retainer
89 first section of control unit
90 second section of control unit
92 processor of first section
94 sensor of first section
96 memory of first section
98 transmitter of first section
100 processor of second section
102 transmitter of second section

DETAILED DESCRIPTION OF THE PREFERRED EMBODIMENT

Turning now descriptively to the drawings, in which similar reference characters denote similar elements throughout the several views, FIGS. 1 through 10 illustrate the combination vehicle alarm and locator system of the present invention indicated generally by the numeral 10.

A pictorial view of the use of the vehicle security feature of the combination vehicle alarm and locator system 10 is illustrated in FIG. 1. As can be seen from this Figure, the user 12 is standing outside a vehicle 14 with the control unit 20 of the combination vehicle alarm and locator system 10. The combination vehicle alarm and locator system 10 also functions as a locator device. Positioned on the control unit 20 is a first key 22 for activating the vehicle security functions of the combination vehicle alarm and locator system 10. When the first key 22 is activated, the control unit 20 generates and transmits a signal to the vehicle 14. The signal is indicated by the line labeled with the numeral 16. The signal 16 is received by the security system of the vehicle 14 and acts to either activate or deactivate the security system. The vehicle security system preferably generates an audible signal when either the system is activated or an attempt is made to circumvent the system. The audible signal generated by the security system is represented by the arced lines labeled with the numeral 18.

Figure 2:
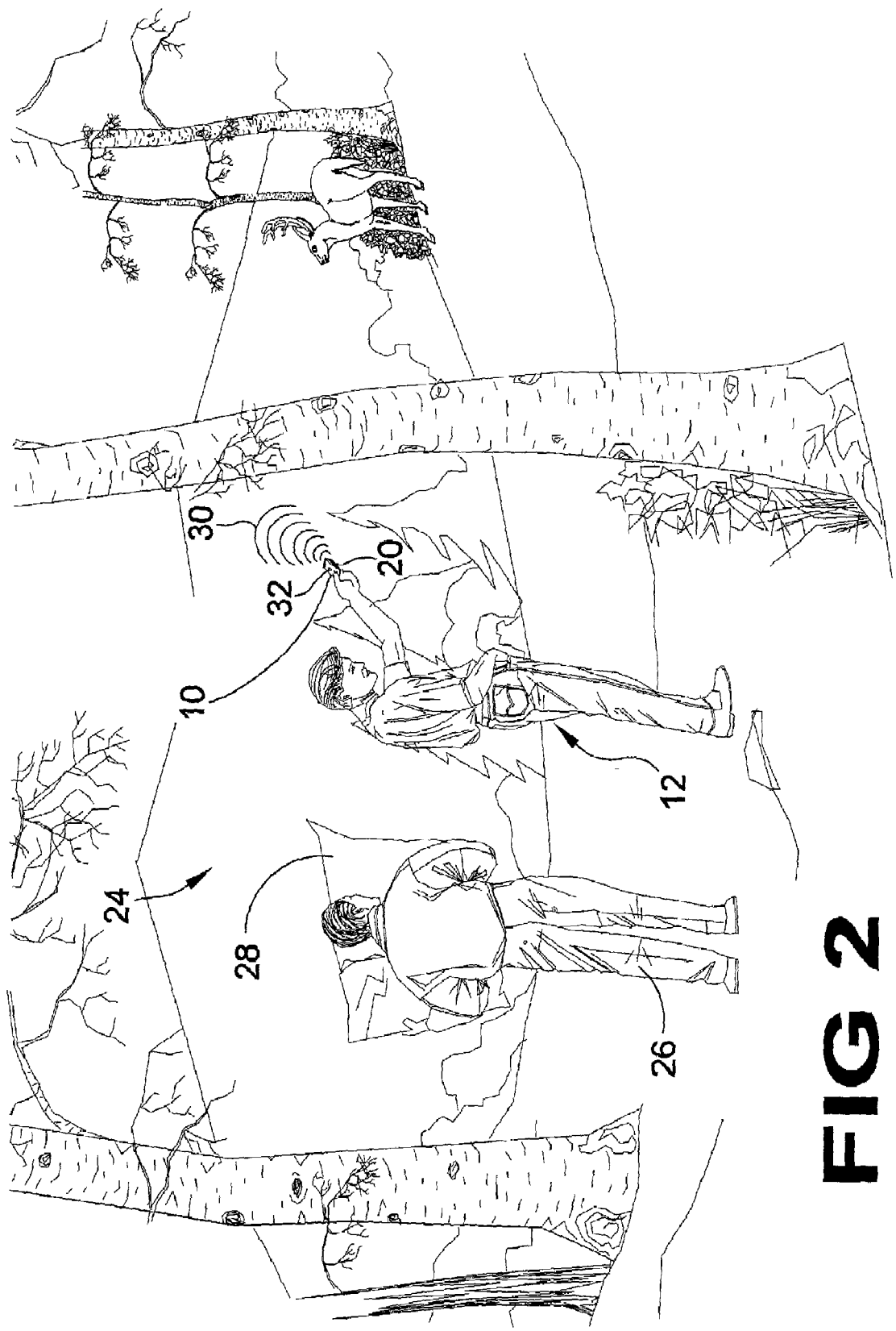
FIG. 2 is a perspective view of a person utilizing the locator feature of the combination vehicle alarm and locator system of the present invention.
Figure 3:
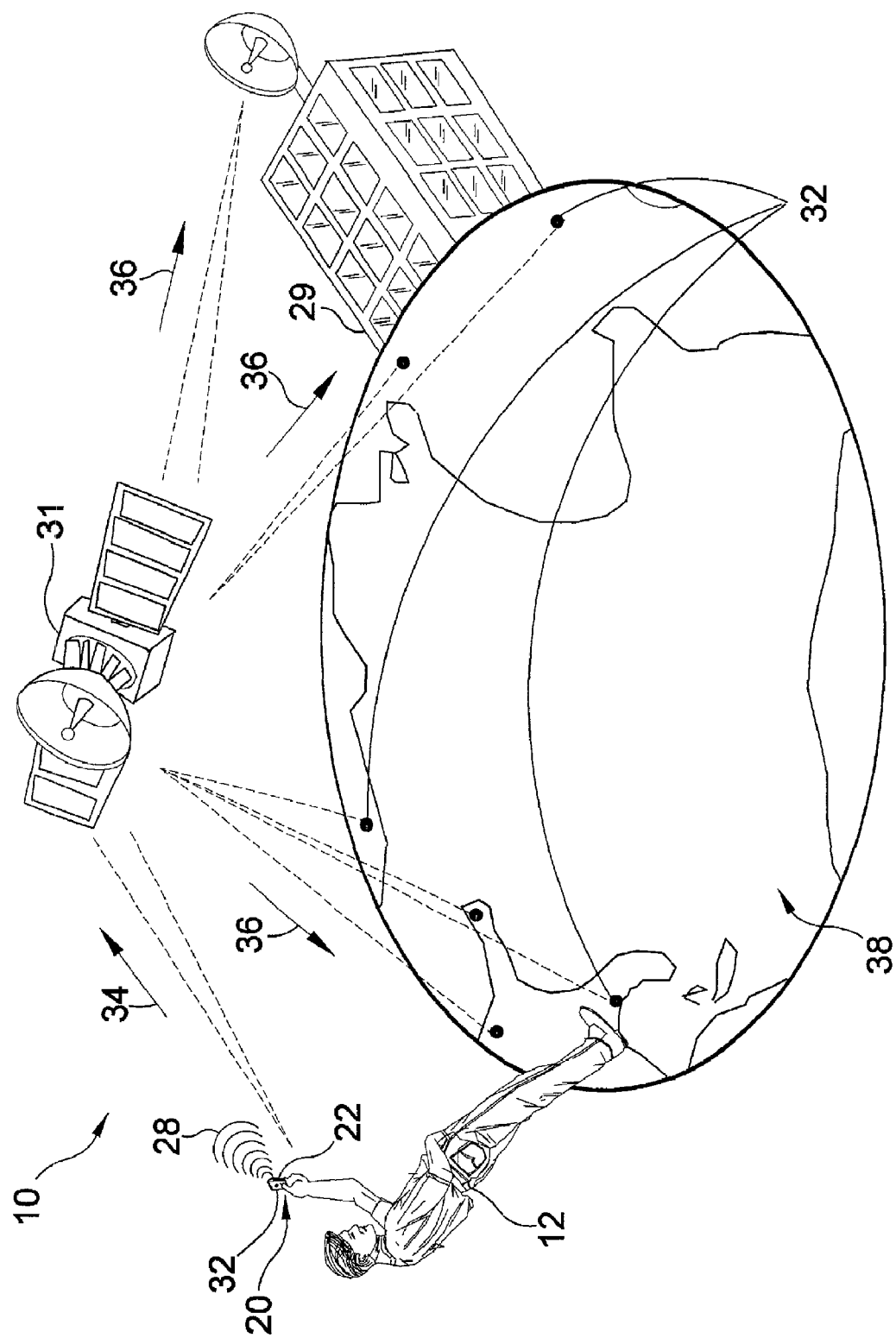
FIG. 3 is a pictorial view of the operation of the locator feature of the combination vehicle alarm and locator system of the present invention including the transmission and reception of signals between an orbiting satellite, the individual user of the combination vehicle alarm and locator system and the ground dispatch station.

FIG. 2 illustrates the combination vehicle alarm and locator system 10 being used by a person 12 lost in a wooded area 24. The person 12 is shown with the combination vehicle alarm and locator system 10 in hand and utilizing the locator function of the system 10 to obtain assistance in finding his way. Also shown is another person 26 attempting to find his way using a map 28. This view illustrates the contrast between use of conventional methods for finding ones way and the use of the combination vehicle alarm and locator system 10 of the present invention. The combination vehicle alarm and locator system 10 is constantly generating and transmitting a location signal indicated by the arced lines labeled with the numeral 30. The location signal 30 is a wave pattern transmitted by the combination vehicle alarm and locator system 10 to an orbiting satellite of the Global Positioning Satellite System which in turn transmits a signal indicating the location of the user and identification information concerning the user to an operations station as can be seen in FIG. 3. The operations station is thus able to determine the position of the control unit 20 and thus the person 12 in possession of the control unit 20 at any time. Upon activation of a second key 32 of the control unit 20, an alarm signal is generated and transmitted along with the location signal 30. This alarm signal alerts the operations station that the person 12 is in need of assistance. Upon receipt of the signal, the operations station dispatches assistance to the user 12 at the identified location. As the location signal 30 indicating the location of the control unit 20 is constantly transmitted and received by the operations station, the operations station can locate the control unit 20 at any time irrespective of whether the second key 32 was activated.

A pictorial view illustrating the operation of the combination vehicle alarm and locator system 10 within a locating system is shown in FIG. 3. This figure shows the transmitting and receiving relations between the combination vehicle alarm and locator system 10 held by the user 12, an orbiting satellite 31 and an operation station 32 when utilizing the locator function. A plurality of operation stations 32 are positioned throughout the world and indicated by the black points. The control unit 20 is constantly transmitting a location signal to the orbiting satellites 31 of the G.P.S, system which receive the signal and determine the location of the control unit 20. The orbiting satellite 31 then transmits a location signal to the operations station 29, thereby allowing the operations station 29 to locate the control unit 20 at any time. When a user 12 is lost or injured at a particular location and requires assistance, the user 12 activates the second key 32 on the control unit 20. Upon activation of the second key 32, an alarm signal is generated and transmitted along with a constantly transmitted location signal 30 as indicated by the arced lines labeled with the numeral 28. The signal 28 is transmitted to a satellite 31 of the G.P.S. locator system. The signal transmission from the control unit 20 to the satellite 31 is indicated by the arrow labeled with the numeral 34. The satellite 31 receives the signal and determines the location of the control unit 20 transmitting the signal. Upon determining the location of the control unit 20, the satellite 31 transmits a signal including the location and identification information concerning the activated control unit 20 to operation stations 32 strategically located around the earth 38. The signal transmitted by the satellite 31 is indicated by the arrow labeled with the numeral 36. Upon receipt of the location signal, the operation stations 32 are able to determine if they are located near the user 12 and provide assistance to the user.

Figure 4:
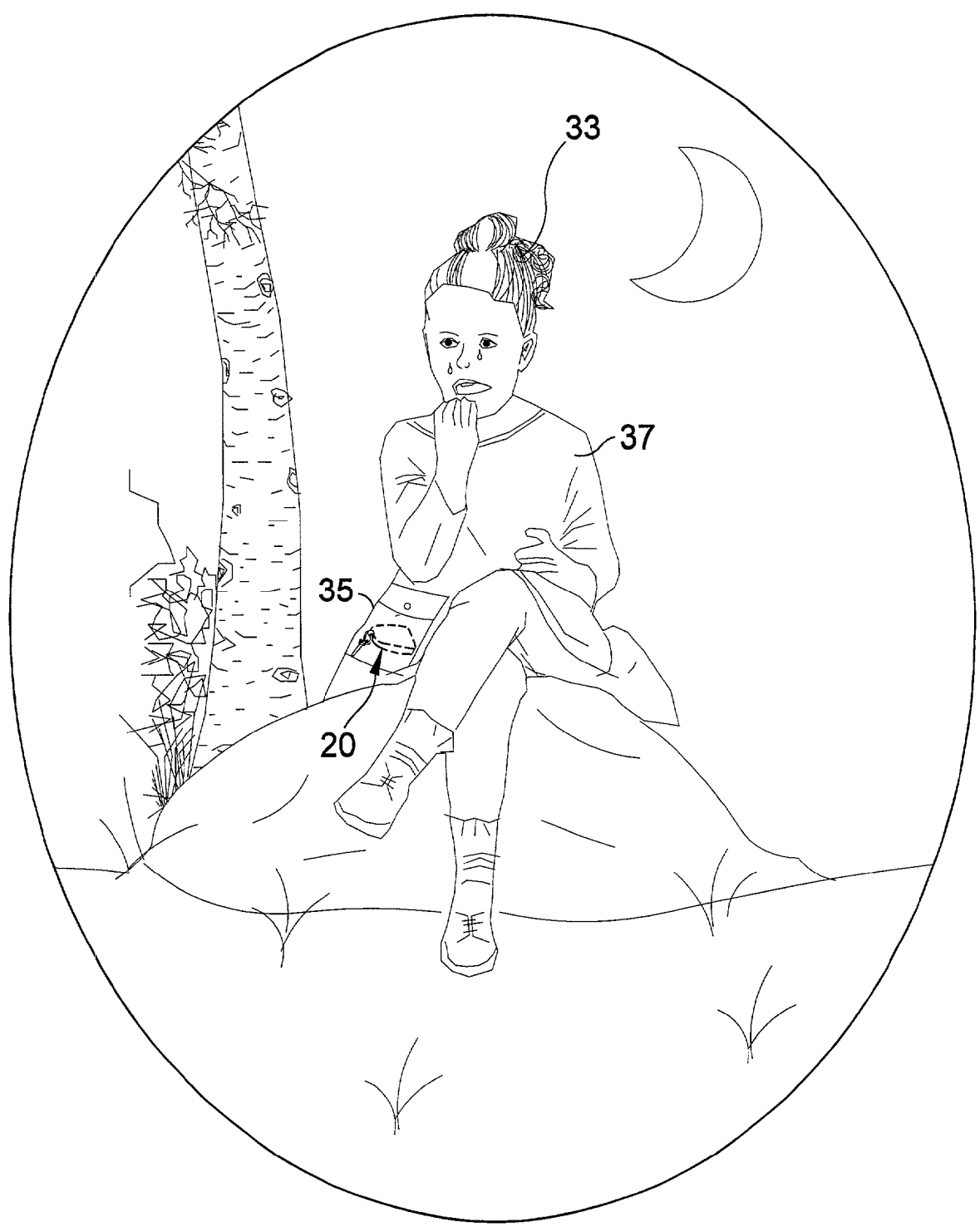
FIG. 4 is a perspective view of a lost child utilizing the locator feature of the combination vehicle alarm and locator system of the present invention.
Figure 5:
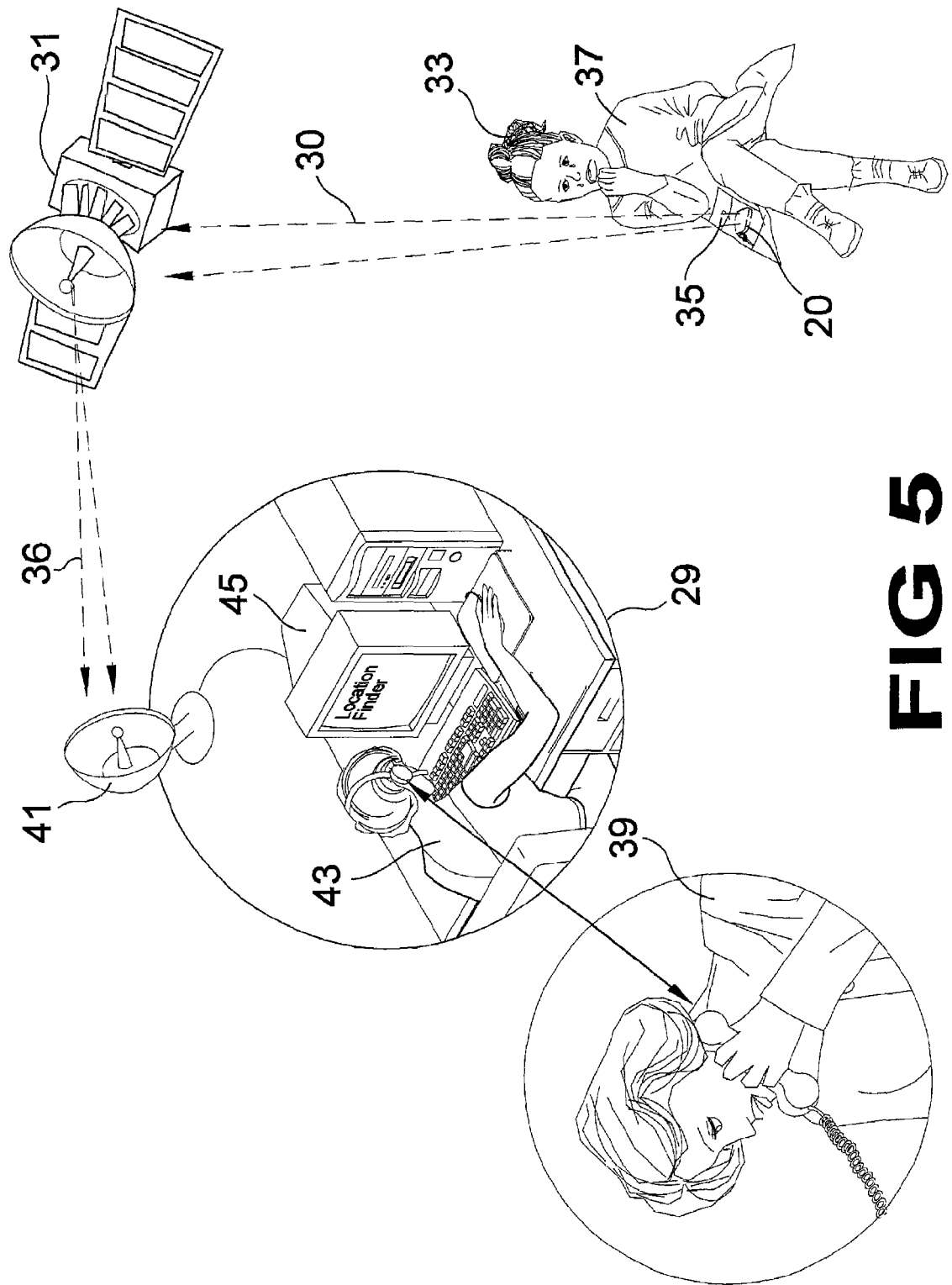
FIG. 5 is a pictoral view of the operation of the lost child using the locator feature of the combination vehicle alarm and locator system of the present invention including the transmission and reception of signals between a small child retaining the combination vehicle alarm and locator system, an orbiting satellite and the ground dispatch station.

A perspective view of a lost child 33 having the combination vehicle alarm and locator system of the present invention is illustrated in FIG. 4. As can be seen from this figure, the lost child 33 is carrying the control unit 20 within a pocket 35 of an item of clothing 37. When an adult is worried that their child is lost or in trouble, all that need be done is to contact the operations station as shown in FIG. 5. As the control unit 20 constantly transmits a location signal 30 to the operations station via the G.P.S. satellite system, the operations station is able to constantly monitor the location of the control unit 20 and thus the child carrying the control unit 20.

A pictorial view illustrating the operation of the combination vehicle alarm and locator system 10 for locating a child 33 is shown in FIG. 5. As can be seen from this figure, a parent 39 is worried as to the location of a child 33. When the parent 39 is worried, the parent 39 is able to call the operations station 29 to determine the location of the child 33. The child 33 is carrying the control unit 20. The control unit 20 constantly transmits a location signal 30 to the operations station 29 via a G.P.S. satellite 31. The G.P.S. satellite 31 receives the signal 30 determines the location of the control unit 20. The G.P.S. satellite 31 then transmits a signal 36 to the operations station 29. The signal 36 includes the location of the control unit 20. This signal 36 is received by a receiver dish 41 at the operations station 29 and provided to a computer system 45. When the parent 39 contacts an operator 43 at the operations station 29, the operator 43 is able to relay the location of the child instantaneously as the operations station 29 constantly monitors the location of the control unit 20 and provides the location information to the central computer system 45.

Figure 6:
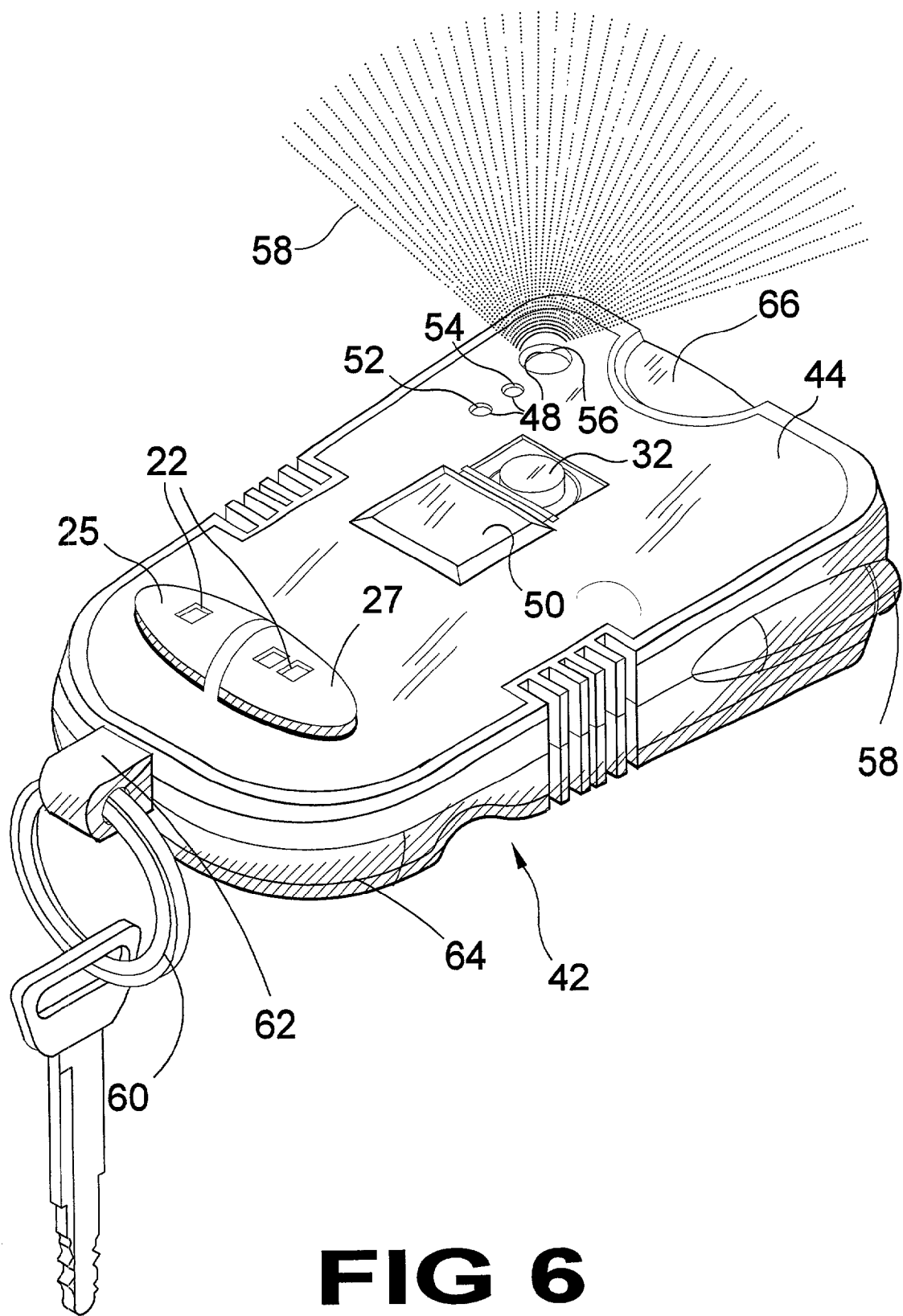
FIG. 6 is an enlarged top perspective view of the control unit of the combination vehicle alarm and locator system of the present invention.

An enlarged perspective view of the control unit 20 is shown in FIG. 6. As can be seen from this figure, the control unit 20 includes a housing 42. Extending through a face side 44 of the housing is the second key 32 and a visual indicator 48. A cover 50 provides selective access to the second key 32 thereby decreasing the possibility of accidental activation of the locator function of the combination vehicle alarm and locator system 10. Activation of the second key 32 causes the alarm signal to be generated and transmitted to the G.P.S. satellite 31 along with the location signal 30. Also extending through the face side 44 of the housing 42 is the first key 22 for activating of the vehicle alarm system. The first key 22 includes a first button 25 for activating the vehicle security system and a second button 27 for deactivating the vehicle security system. The visual indicator 48 includes a first LED 52 for indicating that the battery is low, a second LED 54 for indicating that the device is operating properly and a third LED 56 for indicating that the second key 32 has been activated. Activation of the second key 32 causes the third LED 56 to illuminate as indicated by the dotted lines labeled with the numeral 58. The third LED 56 may be made to flash and thereby provide a more visible indication that the second key 32 has been activated. The first LED 52 illuminates similarly to the third LED 56 when the battery power is low and the second LED 54 illuminates when the device is properly operating. Positioned on a side of the housing 42 is an antenna 58 through which the signal is transmitted to the G.P.S. satellite 31. A key ring 60 is connected to an end of the housing 42 by a key ring retainer 62. The key ring retainer 62 is releasably connected to the side of the housing 42 and therefore is optionally removable from the control unit 20. A battery 64 is slidably positioned into a recess in the housing 42. A cover 66 for covering infrared LED's for transmitting a signal upon activation of the first key 22 is provided on a side of the housing 42.

Figure 7:
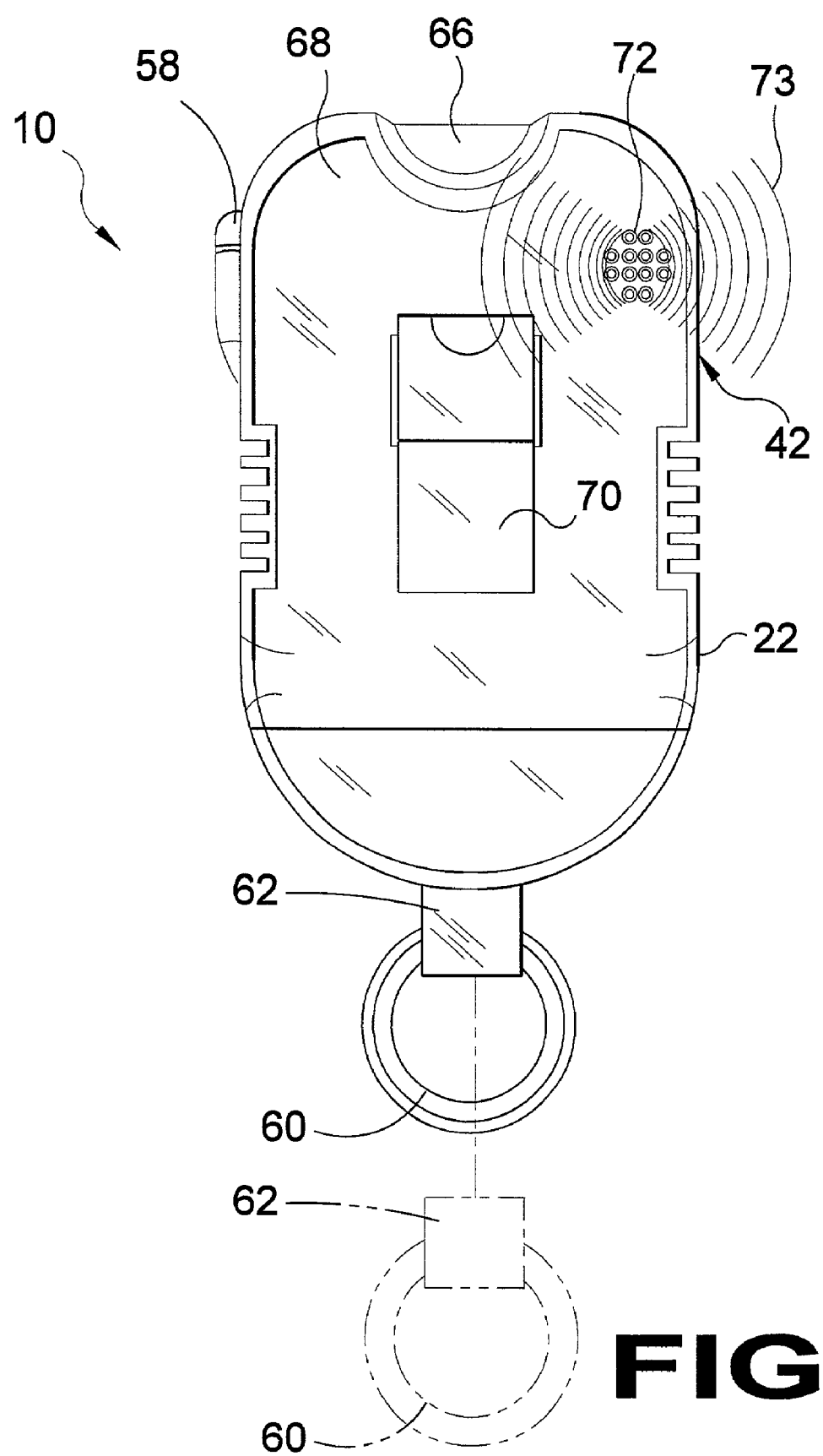
FIG. 7 is a back view of the control unit of the combination vehicle alarm and locator system of the present invention.

A view of the back side of the combination vehicle alarm and locator system 10 is shown in FIG. 7. As can be seen from this view, positioned on a back side of the control unit 20 is a clip 70 for attaching the control unit 20 to an article of clothing or accessory of the user. The clip 70 aids the user in retaining the control unit 20 in a non-obtrusive manner. Also positioned on the back side 68 is a speaker 72 through which audible signals may be generated. The generation of audile signals may optionally occur upon activation of the second key 32 and is illustrated by arced lines labeled with the numeral 73. The audible signals are preferably in the form of a screeching sound for the purpose of frightening away attackers. Extending from a side of the housing is the removable key ring retainer 62 and key ring 60. The removable key ring retainer 62 is selectively removable from its position connected to the control unit 20. Extending from another side of the housing is the antenna 58.

Figure 8:
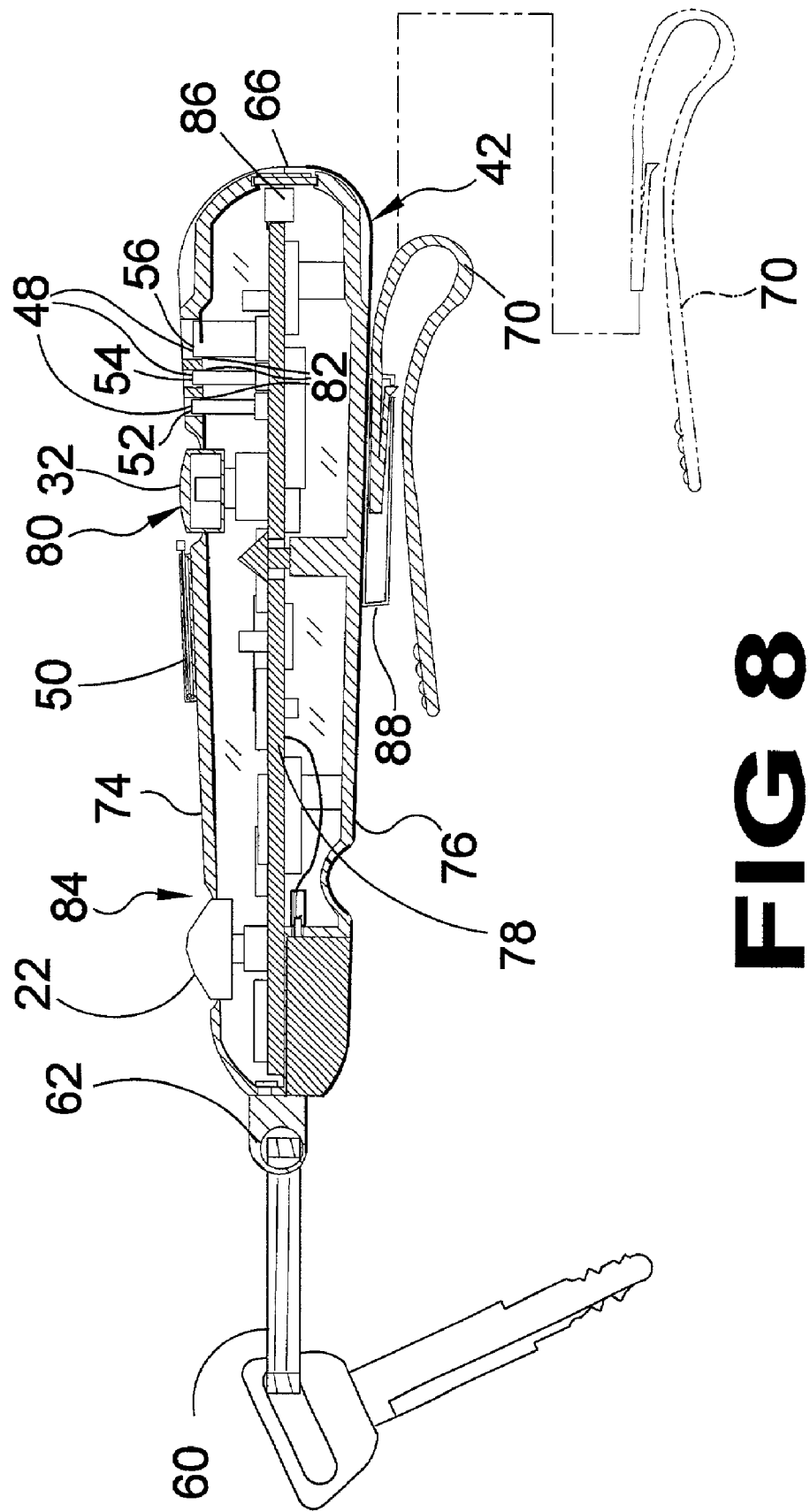
FIG. 8 is a side cross-sectional view of the control unit of the combination vehicle alarm and locator system of the present invention.

A cross-sectional view of the control unit 20 of the combination vehicle alarm and locator system 10 is shown in FIG. 8. As can be seen from this view, the housing 42 includes a top section 74 and a bottom section 76. Positioned between the top and bottom sections 74 and 76 is the internal circuitry 78 of the first key 22 for vehicle security system 10. The top section 74 includes a first recess 80 through which the second key 32 extends, second recesses 82 for receiving the visual indicators 48 and a third recess for receiving the first key 22 for the vehicle security system. Selectively extending from a side of the housing between the top section 74 and the bottom section 76 is the key ring holder 62. The key ring 60 is connected to the key ring holder 62. On a side of the housing 48 opposite the key ring holder 62 is the cover 66. Positioned within the housing and aligned with the cover 66 is an infrared LED 86 for transmitting an infrared signal to a vehicle upon activation of the first key 22. Positioned on the bottom section 76 of the housing 42 is a clip retainer 86. The clip retainer 88 releasably secures the clip 70 to the bottom section 76. Positioned on the bottom side but not shown in this figure is the speaker for generating the audible signal upon activation of the first key 22 or the second key 32.

Figure 9:
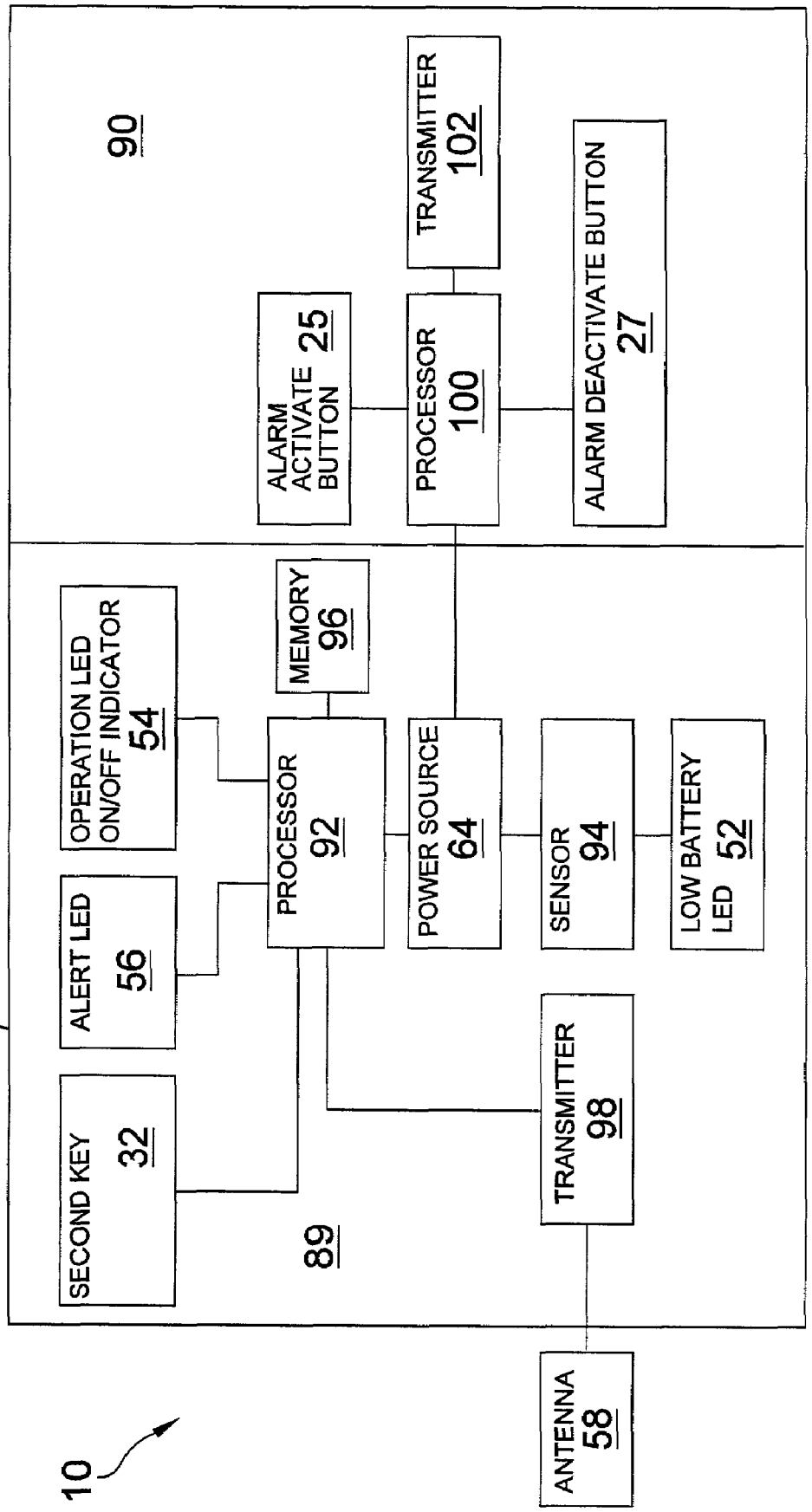
FIG. 9 is a block diagram illustrating the components of the combination vehicle alarm and locator system of the present invention.
Figure 10A:
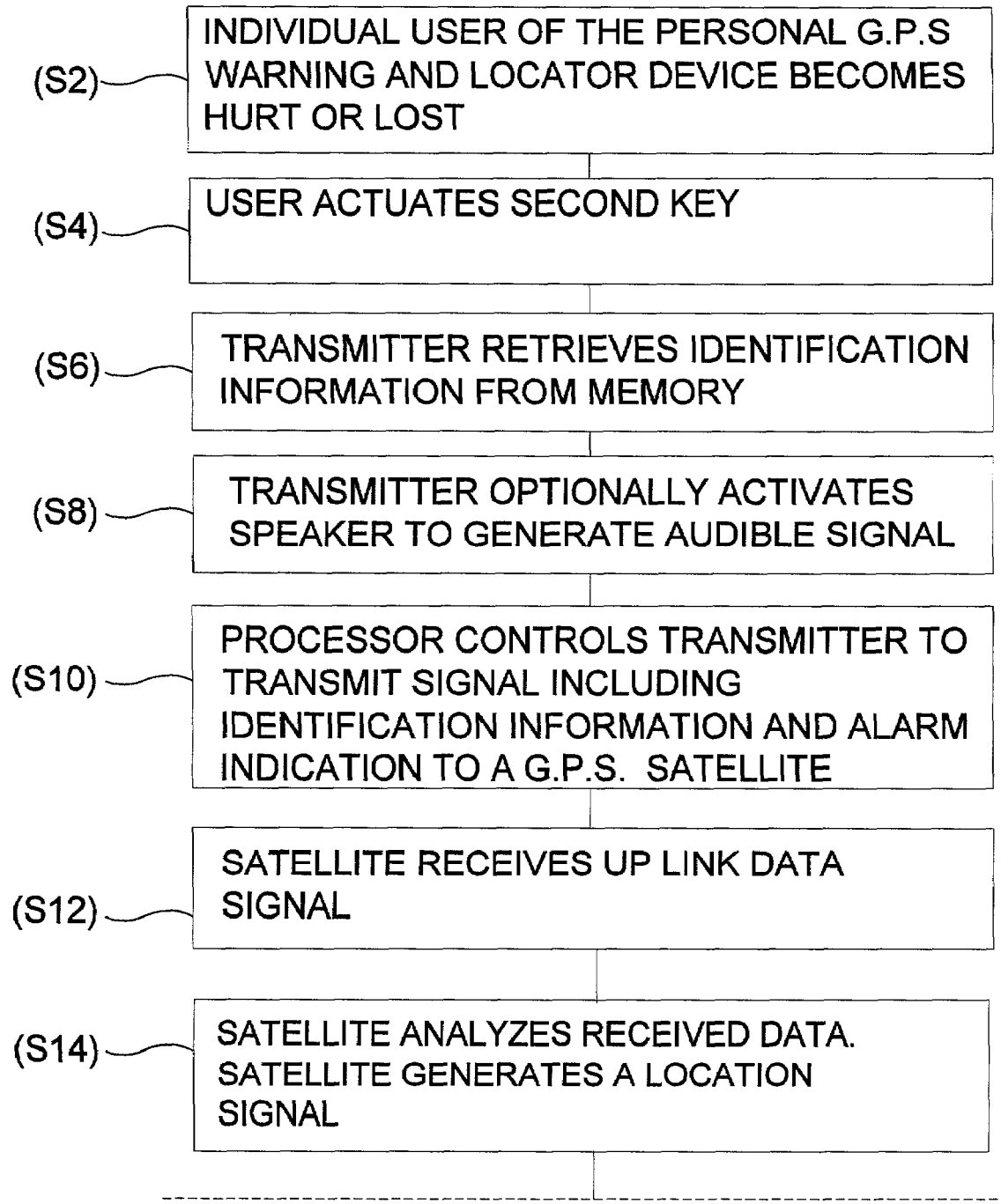
FIG. 10 is a flow diagram describing the operation of the combination vehicle alarm and locator system of the present invention.
Figure 10B:
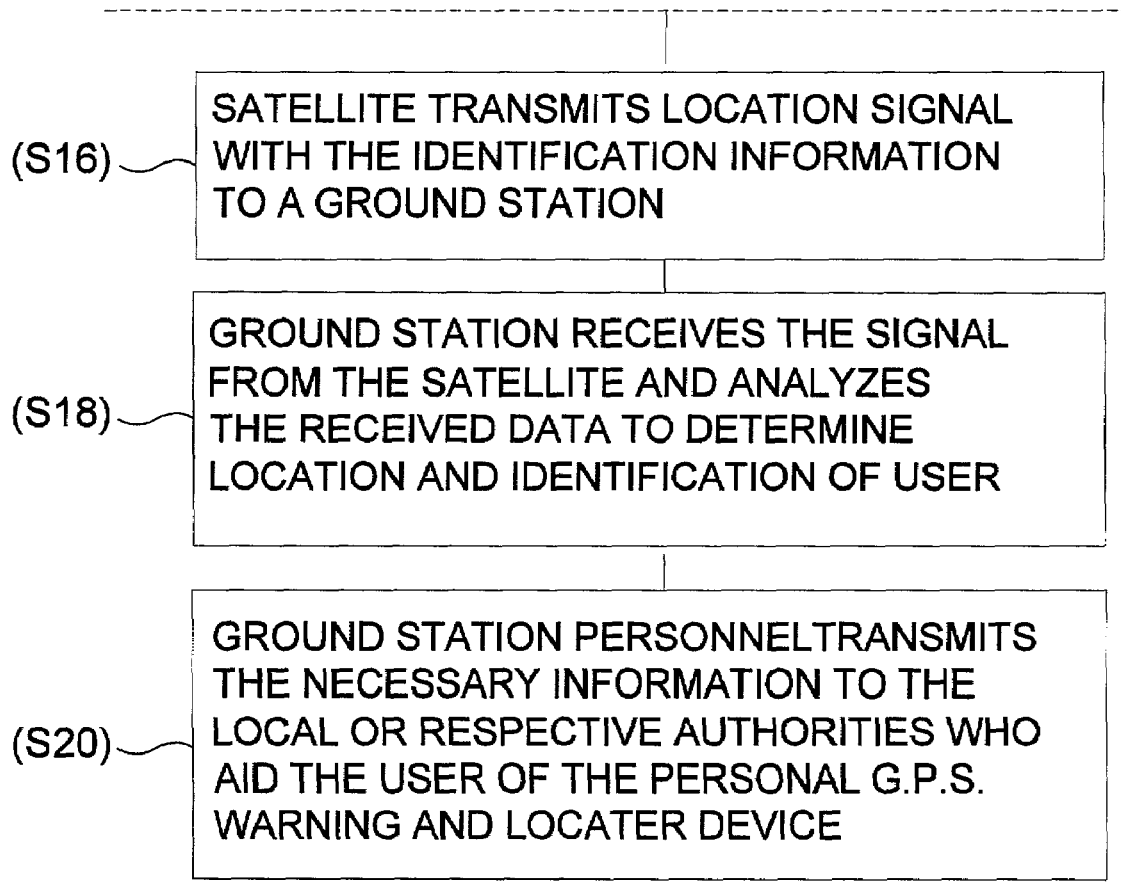

FIG. 9 shows a schematic diagram of the control unit 20 of the combination vehicle alarm and locator system 10. As can be seen from the figure, the control unit includes a first location section 88 and a second vehicle security section 90. Within the first section 88 is a processor 92. The processor 92 is connected to the power source 64. The power source 64 is monitored by a sensor 94 which determines the power level of the power source 64. Upon determining that the power level is below a threshold value, the sensor 94 will activate the low power level LED 52 of the visual indicator 48. A memory 96 is connected to the processor 64 for storing identification information concerning the control unit 20 to be transmitted upon activation of the second key 32. The operation LED 54 and the alert LED 56 are also connected to the processor 92. The second key 32 is also connected to the processor 92. A transmitter 98 is connected between the processor 92 and the antenna 58 for transmitting a signal including the identification information concerning the control unit 20 upon activation of the second key 32.

The second section 90 is provided for activating and deactivating a vehicle alarm system, The second section 90 includes a processor 100 positioned therein, The processor 100 is connected to the power source 64. Alternatively, the second section 90 may include another power source. Connected to the processor 100 are the alarm activate button 25 and the alarm deactivate button 27. A transmitter 102 is also connected to the processor 100. The transmitter 102 is preferably an infrared LED for generating and transmitting an infrared signal to the vehicle alarm system.

The operation of the combination vehicle alarm and locator system 10 will now be described with reference to the figures. In operation, the combination vehicle alarm and locator system 10 is able to both activate a vehicle alarm system and also transmit a distress call through the Global Positioning Satellite System to provide an operations center 29 with a location of a user retaining the control unit 20 of the combination vehicle alarm and locator system 10. In this manner, the operations center 29 is able to dispatch assistance to the user of the combination vehicle alarm and locator system 10. In operation, the control unit 20 of the combination vehicle alarm and locator system 10 is to be retained by the user for activating a vehicle alarm system, deactivating the vehicle alarm system and transmitting a signal to the Global Positioning Satellite System for use in obtaining assistance when injured or lost. The combination vehicle alarm and locator system 10 acts similarly to a conventional vehicle alarm control when the first key 22 for activating a vehicle alarm are utilized.

The combination vehicle alarm and locator system 10 also includes the locator function. The operation of the locator function is described in FIG. 10, As can bee seen from this figure, This function is beneficial when the user suffers an injury or is lost as discussed in step S2. Upon determining that the user is lost or injured, the user activates the second key 32 as stated in step S4. Upon activation of the second key 32, the transmitter 92 retrieves the identification information stored in memory 96 as described in step S6. The processor 92 then optionally activates the speaker 64 to generate an audible signal which may be heard by persons in the area of the user as discussed in step S8. The processor 92 also activates the transmitter 98 to transmit a signal including the identification information and an alarm indication to a G.P.S. satellite as stated in step S10. The signal is received by the G.P.S. satellite 31 as described in step S12. The satellite 31 receives and analyzes the data for generation of a location signal as discussed in step S14. The satellite 31 then transmits the location signal and the identification information to an operations station 29 as stated in step S16. The operations station 29 receives the signal from the satellite 31 and analyzes the signal to determine the location and identification of the user as described in step S18. Upon determining the location and identification of the user, the operations station 29 contacts the authorities in a location near the user so that the authorities may aid the user as stated in step S20.

The user is thus able to contact assistance when needed and also activate a vehicle alarm system using a single handheld control unit 20. The control unit 20 also may be used to retain keys thereon. The control unit 20 may also be clipped to an article of clothing worn by the user using the clip 70 on the back side and thus is unobtrusive to the user.

From the above description it can be seen that the combination vehicle alarm and locator system of the present invention is able to overcome the shortcomings of prior art devices by providing a combination vehicle alarm and locator system which is able to utilize the Global Positioning Satellite (G.P.S.) system and includes a selectively actuated vehicle security function. The combination vehicle alarm and locator system is also able to optionally generate an audible tone, is small, light weight and includes a key ring selectively attached thereto. The combination vehicle alarm and locator system able to provide an alternative to dialing 911 in the case of an emergency when a phone is not available. Furthermore, the combination vehicle alarm and locator system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. An improved GPS device, having a radio portion that communicates with a plurality of satellites for determining a location of the device, the improvement comprising:

an apparatus for unlocking a door on a nearby motor vehicle;

a capability for triggering multiple warnings at different locations, including a first trigger that activates an alarm on the motor vehicle; and a second trigger that transmits the location, via satellite, to a recipient at a distant location that communicates with a ground dispatch station; and wherein the first and second triggers are disposed within a remote control unit for a car alarm.

2. The device of claim 1, further comprising a connector for attachment of a key.

3. The device of claim 1, wherein the alarm is part of a security system of the motor vehicle.

4. The device of claim 3, futher comprising a switch for activating the security system.

5. The device of claim 3, further comprising a switch for de-activating the security system.

6. The device of claim 1, wherein the first and second triggers comprise the same physical trigger.

7. The device of claim 1, further comprising a speaker that emits a sound triggered by operation of at least one of the first and second triggers.

* * * * *